(12) United States Patent
Ishikawa

(10) Patent No.: US 9,461,576 B2
(45) Date of Patent: Oct. 4, 2016

(54) FAN MOTOR DRIVE DEVICE AND BLOWER DEVICE

(71) Applicant: NIDEC SERVO CORPORATION, Kiryu-shi, Gumma (JP)

(72) Inventor: Masatomo Ishikawa, Kiryu (JP)

(73) Assignee: NIDEC SERVO CORPORATION, Gumma (JP)

( * ) Notice: Subject to any disclaimer, the term of this patent is extended or adjusted under 35 U.S.C. 154(b) by 0 days.

(21) Appl. No.: 14/747,324

(22) Filed: Jun. 23, 2015

(65) Prior Publication Data

US 2015/0372630 A1 Dec. 24, 2015

(30) Foreign Application Priority Data

Jun. 24, 2014 (JP) ................. 2014-128968

(51) Int. Cl.
*H03K 5/00* (2006.01)
*H02P 21/14* (2016.01)

(52) U.S. Cl.
CPC ............ *H02P 21/141* (2013.01); *H02P 21/18* (2016.02)

(58) Field of Classification Search
CPC ........................... G05B 13/042; H02P 21/26
See application file for complete search history.

(56) References Cited

U.S. PATENT DOCUMENTS

| 2007/0053769 A1* | 3/2007 | Schlanger ............ F04D 27/004 415/13 |
| 2009/0104034 A1 | 4/2009 | Takada |
| 2011/0000652 A1 | 1/2011 | Takada |

FOREIGN PATENT DOCUMENTS

| JP | 2004-96979 A | 3/2004 |
| JP | 2008-43083 A | 2/2008 |

* cited by examiner

*Primary Examiner* — Karen Masih
(74) *Attorney, Agent, or Firm* — Keating & Bennett, LLP

(57) ABSTRACT

A fan motor drive device configured to drive a fan with a motor includes a position speed estimating calculator configured to calculate estimated values of a rotation angle and a rotation speed of the motor, a multiplier configured to calculate a control target value by multiplying the rotation speed calculated in the position speed estimating calculator and a flow coefficient, and a current vector controller configured to control a drive current of the motor by feedback control based on the control target value. A rotor magnetic flux intensity of the motor is calculated based on at least a drive current obtained by a current sensor and the rotation angle obtained from the position speed estimating calculator, and a control value used in driving the motor is changed by the rotor magnetic flux intensity thus calculated.

12 Claims, 9 Drawing Sheets

FAN MOTOR DRIVE DEVICE AND BLOWER DEVICE

BACKGROUND OF THE INVENTION

1. Field of the Invention

The present invention relates to a fan motor drive device preferably for use, for example, blowing air through a duct.

2. Description of the Related Art

Conventionally, an air blower device is widely used in different fields. For example, in a ceiling-embedded ventilation device, an indoor air is ventilated through a duct by a blower. In such a ventilation device, the load of an air blower device is changed due to the contamination of a duct, the contamination of a filter provided within the duct, etc. International Publication Nos. WO2007/040180 and WO 2009/110219 disclose a configuration in which the fluctuation of a flow rate (wind volume) attributable to the change of a load is reduced by calculating a wind volume from a motor rotation speed and a drive current and controlling the drive of a motor. Furthermore, Japanese Patent Application Publication No. 2008-43083 discloses a configuration in which a motor is driven while detecting the rotational position of a rotor from a drive current without having to separately provide a sensor for detecting the rotational position of the rotor (in a so-called sensor-less manner).

With respect to the control of a motor of such an air blower device, Japanese Patent No. 3653670 discloses a configuration in which a motor is controlled by virtue of so-called vector control.

In a motor, there is a drawback in that the generated torque is changed due to the variation in a rotor magnetic flux intensity at different points of the rotor and further that the rotor magnetic flux intensity varies from motor to motor. As a result, for example, in an air blower device, there is a problem in that the wind volume is changed on a motor-by-motor basis and further that the error of a preset wind volume between motors grows larger.

SUMMARY OF THE INVENTION

In preferred embodiments of the present invention a control amount is variably set based on the rotor magnetic flux intensity in a fan motor drive device which drives a motor by virtue of vector control.

In accordance with a preferred embodiment of the present invention, a fan motor drive device configured to drive a fan with a motor includes a position speed estimating calculator configured to calculate estimated values of a rotation angle and a rotation speed of the motor; a multiplier configured to calculate a control target value by multiplying the rotation speed calculated in the position speed estimating calculator and a flow coefficient; and a current vector controller configured to control a drive current of the motor by feedback control based on the control target value, wherein a rotor magnetic flux intensity of the motor is calculated based on at least a drive current obtained by a current sensor and the rotation angle obtained from the position speed estimating calculator, and a control value used in driving the motor is changed by the rotor magnetic flux intensity thus calculated.

With such configuration, the control target value is set by multiplying the rotation speed and the flow coefficient. This makes it possible to drive the motor by the vector control using the flow-rate-constant control. As a result, it is possible to drive the motor by a process simpler and easier than in related devices so that the flow rate is kept constant. In this case, the rotor magnetic flux intensity of the motor is calculated and the control value used in driving the motor is changed using the rotor magnetic flux intensity thus calculated. This makes it possible to drive the motor at the control value corresponding to the variation of the rotor magnetic flux intensity between motors and to sufficiently reduce the change in the generated torque attributable to the variation of the rotor magnetic flux intensity.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
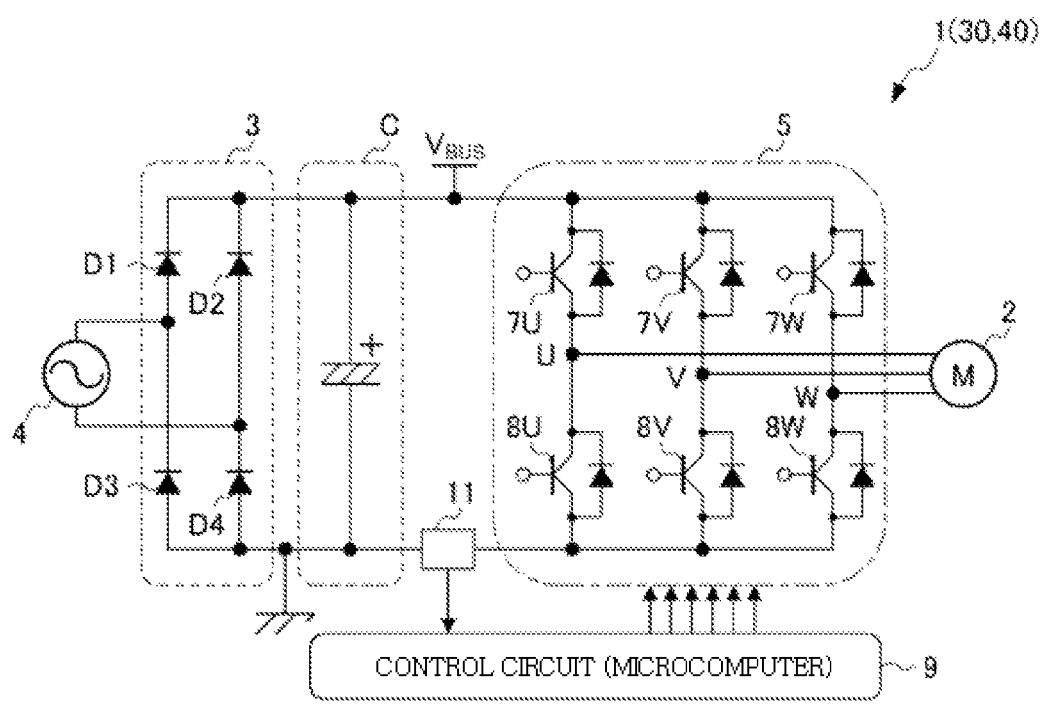
FIG. 1 is a block diagram illustrating a fan motor drive device according to one exemplary preferred embodiment of the present invention.

Hereinafter, preferred embodiments of the present invention will now be described with reference to the accompanying drawings.

In one exemplary preferred embodiment of the present invention, a motor is driven so as to maintain a wind volume at a constant value indicated by a control target value, thus correcting the variation of the wind volume with respect to the control target value, which may be caused by the inter-motor variation. With regard to an air blower device according to this preferred embodiment, descriptions will be initially made on the principle of motor control for maintaining a wind volume at a constant value. If it is assumed that the wind volume (flow rate) related to blowing is Q, the revolution number of a motor used in blowing is N [r/min], and the output of the motor is P [W], the wind volume Q, the revolution number N and the output P are expressed by a proportional relationship and are represented by a relational expression of the following equation.

Equation 1

$$QN^2 \propto P \qquad (1)$$

It can be noted from the above equation that, in order to maintain the wind volume Q constant, the motor may be controlled so that $P/N^2$ is a constant value. If a coefficient ($K_Q \propto Q$) proportional to the wind volume Q is defined, the equation 1 may be transformed as follows.

Equation 2

$$K_Q \cdot N^2 = P \qquad (2)$$

The revolution number N and the output P are converted to physical quantities used in vector control. The revolution number N may be represented by the following equation using an electrical angular velocity $\omega_e$ [rad/sec] and a pole pair number $P_P$ of a motor.

Equation 3

$$N = \frac{60}{2\pi \cdot p_P} \cdot \omega_e \qquad (3)$$

Furthermore, the output P may be represented by the following equation using a torque $\tau$ generated by a motor and a mechanical angular velocity $\omega_m$ [rad/sec].

Equation 4

$$P = \tau \omega_m \qquad (4)$$

In a typical brushless DC motor (surface-magnet-type permanent magnet synchronous motor), the torque $\tau$ may be expressed by the product of a pole pair number $P_P$, a rotor magnetic flux intensity $\Phi$ [Vs/rad] and a q-axis drive current $i_q$ as represented by the following equation.

Equation 5

$$\tau = p_P \cdot \Phi \cdot i_q \qquad (5)$$

Furthermore, the relationship between the mechanical angular velocity $\omega_m$ and the electrical angular velocity $\omega_e$ may be represented by the following equation.

Equation 6

$$\omega_m = \frac{1}{P_P} \cdot \omega_e \qquad (6)$$

Substituting equations (5) and (6) for equation 4, it is possible to obtain a relational expression of the following equation.

Equation 7

$$P = \Phi \cdot i_q \cdot \omega_e \qquad (7)$$

Substituting equations 7 and 3 for equation 2, it is possible to obtain a relational expression of the following equation and to obtain a relational expression of the electrical angular velocity $\omega_e$ and the q-axis drive current $i_q$ for maintaining the wind volume Q constant.

Equation 8

$$\left(\frac{60}{2\pi \cdot p_P}\right)^2 \cdot \frac{1}{\Phi} \cdot K_Q \cdot \omega_e = i_q \qquad (8)$$

Equation 8 may be represented by the following equation using a flow coefficient $K'_Q$.

Equation 9

$$K'_Q \cdot \omega_e = i_q \qquad (9)$$

The flow coefficient $K'_Q$ is represented by the following equation.

Equation 10

$$K'_Q = \left(\frac{60}{2\pi \cdot p_P}\right)^2 \cdot \frac{1}{\Phi} \cdot K_Q \qquad (10)$$

By keeping the electrical angular velocity $\omega_e$ and the q-axis drive current $i_q$ in a proportional relationship, it is possible to drive a motor so that the wind volume is constant.

FIG. 1 is a block diagram illustrating the basic configuration of a fan motor drive device according to one exemplary preferred embodiment of the present invention. The fan motor drive device 1 may be applied to an air blower device (or any other desirable blower or fan device) which blows air by driving a centrifugal fan with a three-phase brushless DC motor 2. In the fan motor drive device 1, an AC power supply 4 is rectified by a rectifier circuit 3 defined by a full-wave rectifier circuit and provided with diodes D1 to D4. Thereafter, the rectified current is smoothened by a smoothening capacitor C, thus generating a DC power supply (a bus voltage) VBus and supplying the DC power supply VBus to an inverter 5. In the inverter 5, three sets of serial circuits defined by drive elements 7U, 7V, 7W, 8U, 8V and 8W such as transistors or field effect transistors (FET) are set so that the drive currents thereof are able to be detected by a current sensor 11, and are disposed between the DC power supply $V_{BUS}$ and the current sensor 11. The connection midpoints of the respective serial circuits are connected to U-phase, V-phase and W-phase coils of a motor 2. Furthermore, the current sensor 11 is connected to a ground line. In the inverter 5, the bases (gates) of the respective drive elements 7U, 7V, 7W, 8U, 8V and 8W are preferably driven by a drive circuit (not illustrated), whereby the motor 2 is driven by the output voltages of the drive elements 7U, 7V, 7W, 8U, 8V and 8W. The current sensor 11 is preferably installed in series between the inverter 5 and a ground line to detect the drives currents of the respective phases of the motor 2. A protective diode is preferably provided in each of the drive elements 7U, 7V, 7W, 8U, 8V and 8W.

Furthermore, in the fan motor drive device 1, a low-voltage DC power supply is generated from the AC power supply by a power supply circuit (not illustrated) and is inputted to a control circuit 9, which preferably includes a microcomputer, a microcontroller, a microprocessor, etc. The control circuit 9 acquires a drive current of the motor 2 from the current sensor 11 and determines a drive voltage of the motor 2 through the vector control calculation based on the drive current information, thus controlling the operation of the inverter 5.

Figure 2:
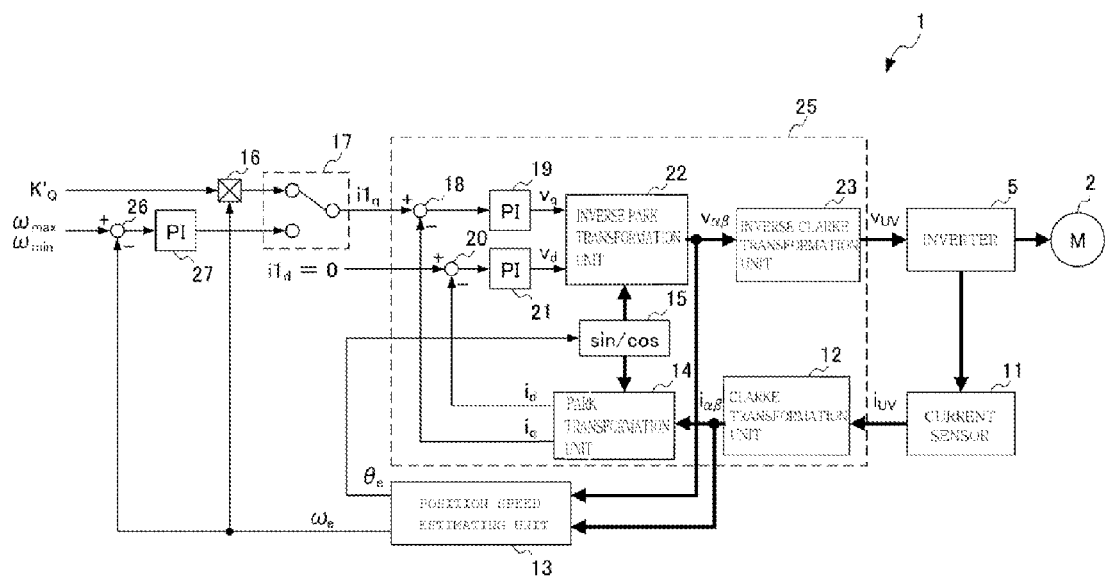
FIG. 2 is a block diagram specifically illustrating the basic configuration of the fan motor drive device illustrated in FIG. 1.

FIG. 2 is a block diagram illustrating, together with peripheral configurations, the functional blocks configured by the execution of processing sequences of the control circuit 9. Moreover, FIG. 2 is a block diagram illustrating the configuration which is the premise of the present invention. The control circuit 9 drives the motor 2 by the configurations of the functional blocks using a sensor-less vector control method.

That is to say, the fan motor drive device 1 inputs a drive current $i_{uv}$ of each phase detected by the current sensor 11 to a Clarke transformer 12. The Clarke transformer 12 outputs a drive current vector $i_{\alpha\beta}$ of a two-phase fixed coordinate system by Clarke-transforming the detection result obtained by the current sensor 11. A position speed estimating calculator 13 acquires a current rotation angle and a current rotation speed of the motor 2 by estimating and calculating a rotation angle $\theta_e$ and an electrical angular velocity $\omega_e$ of a rotor from the drive voltage vector $V_{\alpha\beta}$ of the two-phase fixed coordinate system corresponding to the drive current vector $i_{\alpha\beta}$ of the two-phase fixed coordinate system and outputting the rotation angle $\theta_e$ and an electrical angular velocity $\omega_e$. A calculator (sin/cos) 15 calculates and outputs sine and cosine values of the rotation angle $\theta_e$ calculated in the position speed estimating calculator 13. A Park transformer 14 converts the drive current vector $i_q$ to a q-axis drive current $i_q$ and a d-axis drive current $i_d$ of a rotary coordinate system and outputs the q-axis drive current $i_q$ and the d-axis drive current $i_d$ by Park-transforming the drive current vector $i_{\alpha\beta}$ of the two-phase fixed coordinate system using the calculation result of the calculator 15.

In the fan motor drive device 1, the flow coefficient $K'_Q$ according to equation 9 is inputted as a wind volume control target value from a host controller. A multiplier 16 multiplies the flow coefficient $K'_Q$ and the electrical angular velocity $\omega_e$ calculated in the position speed estimating calculator 13. Thus, the fan motor drive device 1 executes the multiplying process of the left side of equation 9 and outputs a wind-volume-constant target drive current value $i_q$ as a control target drive current to a subtracting circuit 18 via a switch 17. The subtracting circuit 18 subtracts the q-axis drive current $i_q$ calculated in the Park transformer 14 from the output value of the switch 17 and outputs the subtracted value. A PI controller (PI) 19 amplifies the output value of the subtracting circuit 18 with a predetermined gain and calculates a moving integral value of the output value of the subtracting circuit 18. Thereafter, the moving integral value is amplified by a predetermined gain and is added, thus calculating a q-axis drive voltage $V_q$ which is a control value related to proportional integral control. A subtracting circuit 20 calculates and outputs a subtracted value of the control target value $i1_d$ (which is 0 in this example) corresponding to the d-axis drive current $i_d$ calculated in the Park transformer 14. A PI controller (PI) 21 calculates and outputs a d-axis drive voltage $V_d$ which is a control value related to the proportional integral control of the subtracting circuit 20.

Using the calculation result of the calculator 15, an inverse Park transformer 22 inversely Park-transforms the q-axis drive voltage $V_q$ and the d-axis drive voltage $V_d$ outputted from the PI controllers 19 and 21 and outputs a drive voltage vector $V_{\alpha\beta}$ of a two-phase fixed coordinate system. An inverse Clarke transformer 23 inversely Clarke-transforms the drive voltage vector $V_{\alpha\beta}$ of the two-phase fixed coordinate system outputted from the inverse Park transformer 22 and outputs a drive voltage vector $V_{UVW}$ of a three-phase fixed coordinate system. In the fan motor drive device 1, the drive voltage vector $V_{UVW}$ of the three-phase fixed coordinate system outputted from the inverse Clarke transformer 23 is pulse-width-modulated and applied to coils of the motor 2, thus driving the motor 2.

Figure 3:
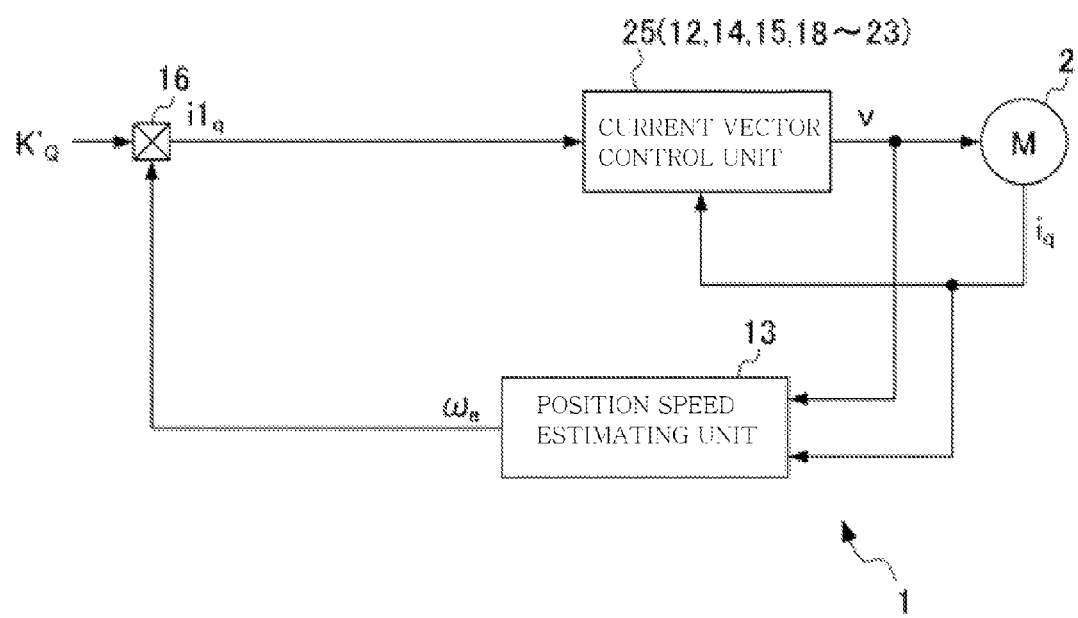
FIG. 3 is a view used in explaining the block diagram illustrated in FIG. 2.

Thus, as illustrated in FIG. 3 which schematically shows the configuration of FIG. 2, the fan motor drive device 1 performs feed-back control so that the multiplied value of the flow coefficient $K'_Q$ inputted from a host controller and the electric angular velocity $\omega_e$ becomes a wind-volume-constant q-axis target drive current $i1_q$ and the drive current $i_q$ matches with the wind-volume-constant q-axis target drive current $i1_q$. The fan motor drive device 1 drives the motor 2 so as to maintain the relational expression of equation 9, consequently driving the motor 2 by wind-volume-constant control.

The Clarke transformer 12, the calculator 15, the Park transformer 14, the subtracting circuits 18 and 20, the PI controllers 19 and 21, the inverse Park transformer 22 and the inverse Clarke transformer 23 define a current vector controller 25 which controls the drive current of the motor 2 according to a control target.

In driving the motor 2, it is necessary to set a lower limit value and an upper limit value of a rotation speed. That is to say, during the low-speed rotation and during the low load, the drive current and the drive voltage are kept low in the motor 2. Thus, the estimating accuracy of the position and speed is deteriorated. This makes it difficult to stably drive the motor 2. Accordingly, it is necessary to set a lower limit value of a rotation speed. In order to protect the circuits and/or the motor 2 from the heat and vibration generated during the high-speed rotation, it is necessary to set an upper limit value of a rotation speed.

Thus, in the fan motor drive device 1 (see FIG. 2), a speed control target value is inputted to a subtracting circuit 26 by changing a speed upper limit value $\omega_{max}$ and a speed lower limit value $\omega_{min}$. Then, a subtracted value is calculated by subtracting the speed control target value from the electric angular velocity $\omega_e$ estimated in the position speed estimating calculator 13. Furthermore, the subtracted value thus calculated is inputted to a PI controller 27 to calculate a speed-constant q-axis target drive current $i1_q$ related to the proportional integral control. The calculation result is outputted to the switch 17. In the fan motor drive device 1, the electric angular velocity $\omega_e$ estimated in the position speed estimating calculator 13 is determined by a determination processor (not illustrated). The operation of the switch 17 and the speed control target value are switched depending on the determination result. Thus, the control of the motor 2 is switched between wind-volume-constant control and speed-constant control, thus driving the motor 2 so that the rotation speed of the motor 2 does not exceed the upper limit value and the lower limit value.

More specifically, if the electric angular velocity $\omega_e$ estimated in the position speed estimating calculator 13 exceeds the upper limit value $\omega_{max}$ in a state in which the multiplied value is outputted from the multiplier 16 to the subtracting circuit 18 via the switch 17 to drive the motor 2 using the wind-volume-constant control, the determination processor sets the speed control target value at the upper limit value $\omega_{max}$ and switches the operation of the switch 17 so that the output value of the PI controller 27 is outputted to the subtracting circuit 18. Thus, the control of the motor 2 is switched from the wind-volume-constant control to the speed-constant control, thus maintaining the rotation speed of the motor 2 at the upper limit value $\omega_{max}$.

If the speed-constant q-axis target current $i1_q$ outputted from the PI controller 27 becomes equal to or larger than the multiplied value $K'_Q \cdot \omega_e$ of the electric angular velocity $\omega_e$ estimated in the position speed estimating calculator 13 and the flow coefficient $K'_Q$ in a state in which the motor 2 is driven by the speed-constant control so that the rotation speed of the motor 2 is maintained at the upper limit value $\omega_{max}$, the multiplied value is outputted from the multiplier 16 to the subtracting circuit 18 via the switch 17, thus driving the motor 2 by the wind-volume-constant control. That is to say, the switch 17 is configured to switch the control of the motor 2 from the speed-constant control to the wind-volume-constant control.

If the electric angular velocity $\omega_e$ estimated in the position speed estimating calculator 13 becomes lower than the lower limit value $\omega_{min}$ in a state in which the motor 2 is driven by the wind-volume-constant control, the speed control target value is set at the lower limit value $\omega_{min}$ and the operation of the switch 17 is switched so that the output value of the PI controller 27 is outputted to subtracting circuit 18. Thus, the control of the motor 2 is switched from the wind-volume-constant control to the speed-constant control, thus maintaining the rotation speed of the motor 2 at the lower limit value $\omega_{min}$.

If the speed-constant q-axis target current i1$_q$ outputted from the PI controller 27 becomes smaller than the multiplied value $K'_Q \omega_e$ of the electric angular velocity $\omega_e$ estimated in the position speed estimating calculator 13 and the flow coefficient $K'_Q$ in a state in which the rotation speed of the motor 2 is maintained at the lower limit value $\omega_{min}$ by the speed-constant control, the multiplied value is outputted from the multiplier 16 to the subtracting circuit 18 via the switch 17, thus driving the motor 2 by the wind-volume-constant control. That is to say, the switch 17 switches the control of the motor 2 from the speed-constant control to the wind-volume-constant control.

When changing the drive using the wind-volume-constant control and the drive at the upper and lower limit values of the rotation speed using the speed-constant control, there may be provided hysteresis characteristics.

Figure 4:
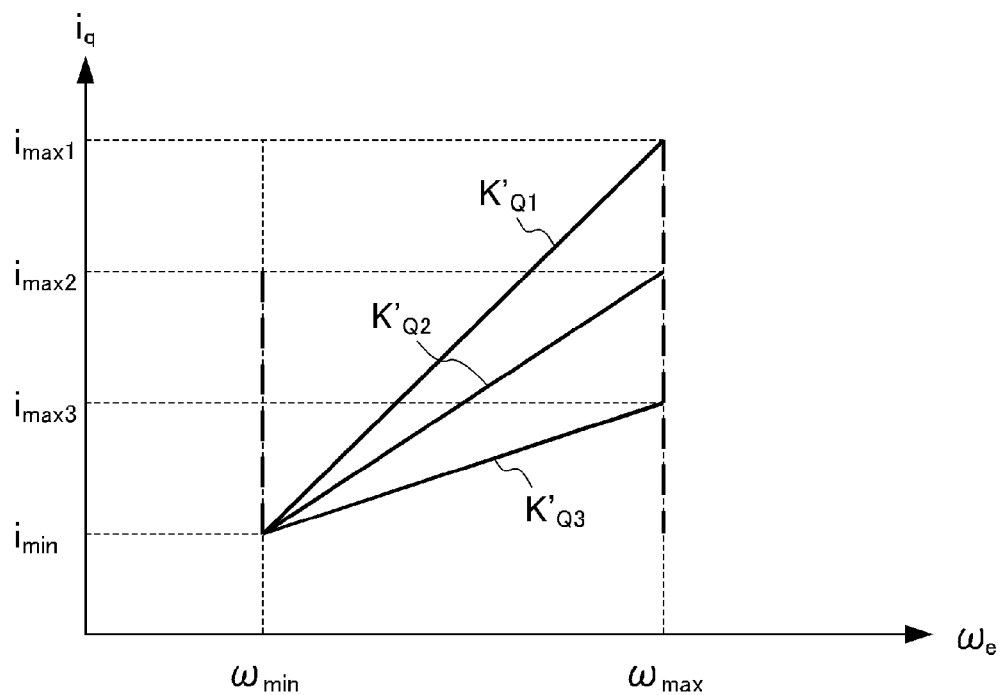
FIG. 4 is a characteristic curve diagram illustrating control characteristics according to one exemplary preferred embodiment of the present invention.

FIG. 4 is a characteristic curve diagram illustrating the characteristics of the fan motor drive device 1 related to the conversion of drive. In the state in which the motor 2 is driven by the wind-volume-constant control, the motor 2 is driven by the characteristic of the drive current and the rotation speed which depends on the proportionality coefficient pursuant to the flow coefficient $K'_Q$ (see the range indicated by solid lines). For example, if the static pressure within a flow path grows higher in this state, the rotation speed of the motor 2 is increased in order to keep the wind volume constant. At this time, if the rotation speed of the motor 2 exceeds the upper limit value, the drive of the motor 2 is switched to the drive using the speed-constant control, whereby the motor 2 is driven at the upper limit value (see the range indicated by a broken line). If the static pressure within a flow path becomes lower in a state in which the motor 2 is driven at the upper limit value of the rotation speed by the speed-constant control, the load of the motor 2 grows larger and the drive current increases. In this case, if the magnitude of the drive current exceeds the multiplied value of the flow coefficient and the rotation speed, the drive of the motor 2 is switched to the drive using the original wind-volume-constant control.

If the static pressure within a flow path becomes lower in the drive using the wind-volume-constant control, the rotation speed of the motor 2 is reduced in order to keep the wind volume constant. In this case, if the rotation speed of the motor 2 becomes lower than the lower limit value, the drive of the motor 2 is switched to the drive using the speed-constant control, thus driving the motor 2 at the lower limit value. If the static pressure within a flow path grows larger in a state in which the motor 2 is driven at the lower limit value of the rotation speed by the speed-constant control, the load of the motor 2 becomes smaller and the drive current is reduced. In this case, if the magnitude of the drive current is smaller than the multiplied value of the flow coefficient and the rotation speed, the drive of the motor 2 is switched to the drive using the original wind-volume-constant control (see the range indicated by a broken line).

Figure 5:
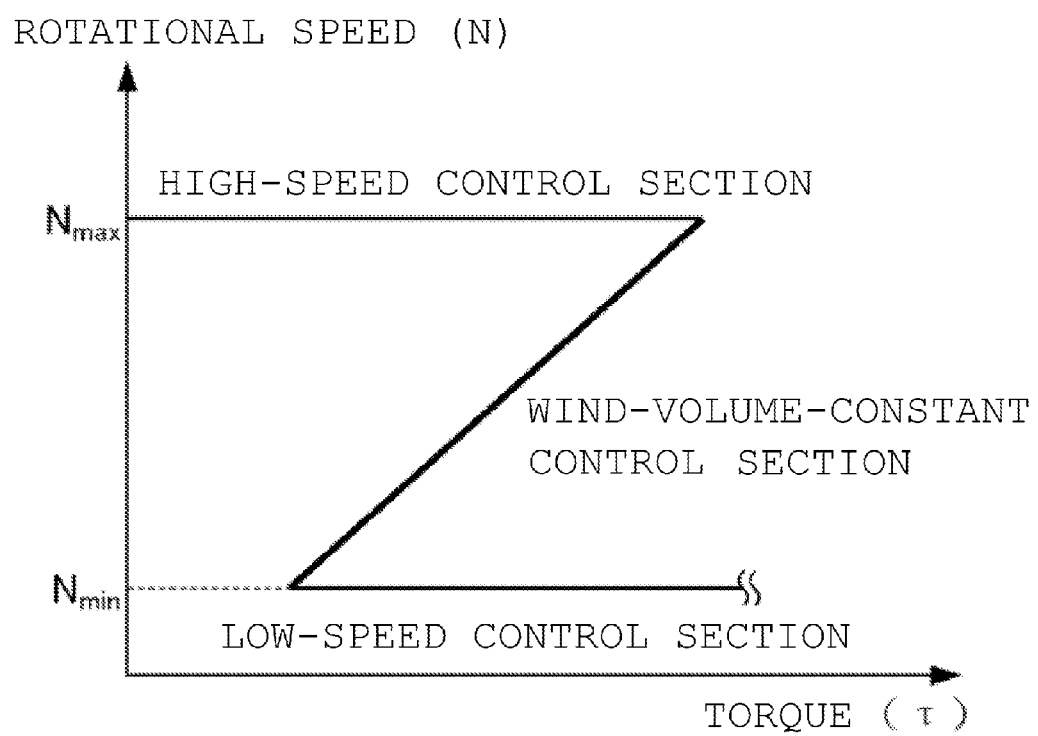
FIG. 5 is a characteristic curve diagram illustrating torque-related control characteristics according to one exemplary preferred embodiment of the present invention.

Thus, as illustrated in FIG. 5 in contrast with FIG. 4, the fan motor drive device 1 drives the motor 2 in a controller (a wind-pressure-constant controller) in which the motor 2 is driven by wind-pressure-constant control and other controllers (a high-speed controller and a low-speed controller) in which the motor 2 is driven at a high speed and a low speed.

According to the configuration illustrated in FIG. 2, the motor is driven by vector control. The target drive current is calculated by multiplying the current rotation speed and the flow coefficient. Feed-back control is performed such that the target drive current matches with the actual drive current. Thus, it is possible to drive the motor by a process simpler and easier than the related art so that the wind volume is kept constant. Particularly, the aforementioned configuration is effective in controlling a wind volume in a centrifugal fan such as a blower or the like.

Furthermore, by adjusting the flow coefficient, it is possible to set the wind volume at a desired magnitude. The method of adjusting the flow coefficient may be, for example, a method in which a volume knob or the like is installed within a fan motor drive device and a flow coefficient is adjusted by operating the volume knob, or a method in which the magnitude of a wind volume is instructed from a host controller or the like.

In addition, if the control of a motor is switched by determining an upper limit value and a lower limit value of a rotation speed with a determination processor, it is possible to drive the motor so that the rotation speed does not exceed the upper limit value and the lower limit value.

Figure 6:
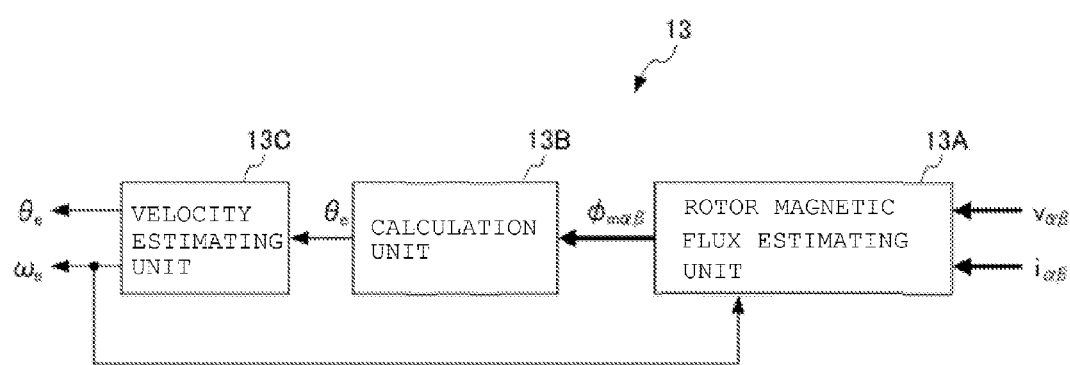
FIG. 6 is a block diagram illustrating the detailed configuration of a position speed estimating calculator according to one exemplary preferred embodiment of the present invention.

FIG. 6 is a block diagram specifically illustrating the configuration of the position speed estimating calculator 13. In the position speed estimating calculator 13, a rotor magnetic flux estimator 13A calculates an estimated value $\phi_{m\alpha\beta}$ of a rotor magnetic flux intensity from a drive current vector $i_{\alpha\beta}$ and a drive voltage vector $V_{\alpha\beta}$ of a two-phase fixed coordinate system and an electric angular velocity $\omega_e$. Even if the internal parameters (nominal values of a resistance and an inductance) of the rotor magnetic flux estimator 13A slightly differ from actual values, the rotor magnetic flux estimator 13A feed-back calculates the estimated value $\phi_{m\alpha\beta}$ so that the estimated value $\phi_{m\alpha\beta}$ gradually comes close to an actual value. Thus, the estimated value $\phi_{m\alpha\beta}$ reflects the actual value. A calculator 13B calculates a rotation angle $\theta_e$ of a rotor by a calculation process of the following equation and outputs the rotation angle $\theta_e$.

Equation 11

$$\theta_e = \tan^{-1}\left(\frac{\phi_{m\beta}}{\phi_{m\alpha}}\right) \tag{11}$$

A velocity estimator 13C calculates an electric angular velocity $\omega_e$ using the rotation angle $\theta_e$ found in the calculator 13B. The position speed estimating calculator 13 outputs the rotation angle $\theta_e$ found in the calculator 13B and the electric angular velocity $\omega_e$ found in the velocity estimator 13C, to the calculator 15. Thus, the fan motor drive device 1 is configured to drive the motor 2 by detecting the rotational position of the rotor in a sensor-less manner.

Figure 7:
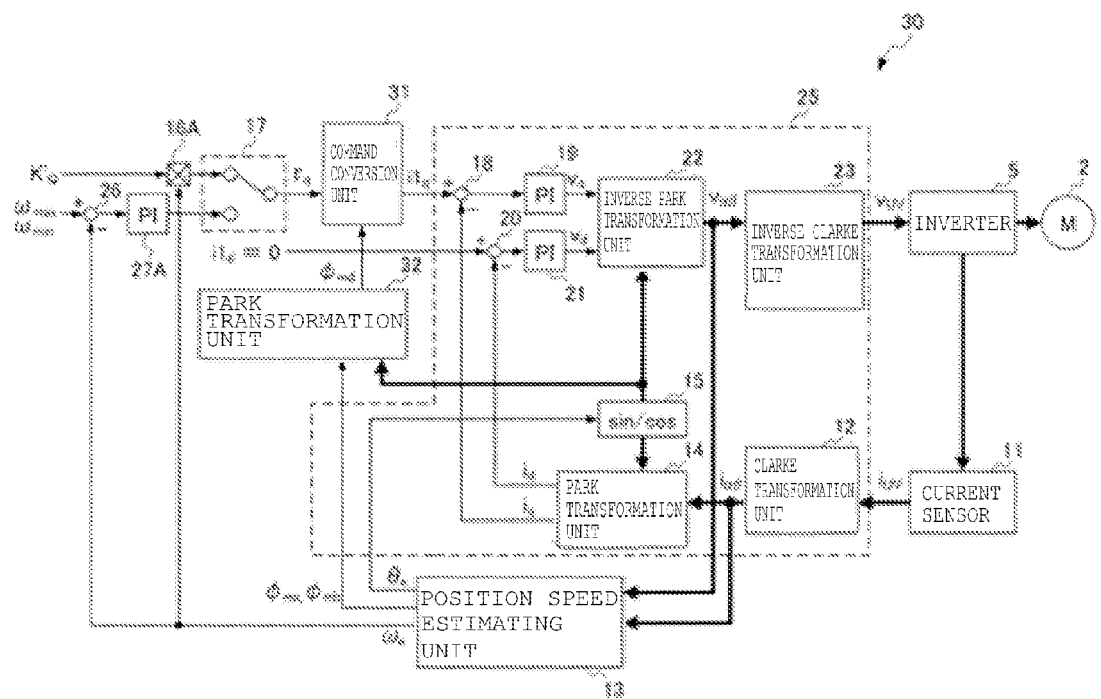
FIG. 7 is a block diagram illustrating the specific detailed configuration of a fan motor drive device according to one exemplary preferred embodiment of the present invention.

FIG. 7 is a block diagram illustrating, in contrast with FIG. 2, the specific configuration of a fan motor drive device according to one exemplary preferred embodiment of the present invention. As represented by equation 9, the fan motor drive device 1 illustrated in FIG. 2 preferably controls the electric angular velocity $\omega_e$ and the q-axis drive current $i_q$ so that they are maintained in a proportional relationship, consequently driving the motor 2 by the wind-volume-constant control. As represented by equation 5, the torque $\tau$ is denoted by the product of the pole pair number $P_P$, the rotor magnetic flux intensity $\Phi$ [Vs/rad] and the q-axis drive current $i_q$. The pole pair number $P_P$ and the rotor magnetic flux intensity $\Phi$ [Vs/rad] are values corresponding to the torque constant of the motor. Thus, the torque $\tau$ is changed in proportion to the drive current $i_q$. By controlling the motor 2 so that the torque $\tau$ and the rotation speed (the electric angular velocity) $\omega_e$ are proportional to each other, it is possible to drive the motor 2 by the wind-volume-constant control.

However, in the mass-produced motors, the rotor magnetic flux intensity $\Phi$ varies due to the deviation of magnetization, the deviation of air gaps, etc. This deviation is said to typically be about ±10%, for example. Therefore, even if the drive current $i_q$ is accurately controlled, the generated torque varies from motor to motor in the fan motor drive device 1. As a result, with respect to the control target value indicated by the flow coefficient $K'_Q$, the wind volume actually kept at a constant value by the wind-volume-constant control largely varies from motor to motor.

In order to correct such variation, it is necessary to control the torque instead of the drive current. When controlling the torque, it is necessary to acquire the rotor magnetic flux intensity. Thus, in the configuration illustrated in FIG. 7, the position speed estimating calculator 13 detects the estimated value of the rotor magnetic flux intensity. The torque is controlled by effectively using the estimated value acquired in the position speed estimating calculator 13.

In a fan motor drive device 30 illustrated in FIG. 7, a multiplier 16A and a PI controller 27A are preferably provided in place of the multiplier 16 and the PI controller 27. Furthermore, a command converter 31 and a Park transformer 32 are additionally provided. In the fan motor drive device 30, it is necessary to Park-transform the estimated value $\phi_{m\alpha\beta}$ of the rotor magnetic flux intensity acquired in the position speed estimating calculator 13 by indicating the estimated value $\phi_{m\alpha\beta}$ in a vector quantity on a fixed rectangular coordinate system (or a $\beta$ coordinate system). It is also necessary to detect the magnitude of a magnetic flux (a d-axis component) $\phi_{md}$ represented by the following equation.

Equation 12

$$\phi_{md} = \phi_{m\alpha} \cdot \cos\theta_e + \phi_{m\beta} \cdot \sin\theta_e \quad (12)$$

In this preferred embodiment, the fan motor drive device 30 inputs the sine and cosine values of the rotation angle $\theta_e$ outputted from the calculator 15, to the Park transformer 32. The Park transformer 32 acquires the estimated value $\phi_{md}$ of the rotor magnetic flux intensity by the calculation process of equation 12.

Furthermore, the multiplier 16A converts the flow coefficient $K'_Q$, which is a control target value pursuant to a q-axis current, to a torque command value $\tau_q$ by the calculation process of the following equation using the flow coefficient $K'_Q$ and the electric angular velocity $\omega_e$ calculated in the position speed estimating calculator 13, and outputs the torque command value $\tau_q$ thus converted. In correspondence thereto, the PI controller 27A outputs a control target value according to the torque command value.

Equation 13

$$\tau = K_Q \cdot \omega_e \quad (13)$$

The fan motor drive device 30 changes the output value of the switch 17 pursuant to the estimated value $\phi_{md}$ of the rotor magnetic flux intensity by allowing the command converter 31 to execute the calculation process of the following equation with respect to the control target value pursuant to the torque command value $\tau_q$ outputted from the switch 17. Accordingly, the fan motor drive device 30 is capable of effectively avoiding the variation of the generated torque attributable to the variation of the rotor magnetic flux intensity, thus driving the motor 2 by the wind-volume-constant control using the wind volume corresponding to the flow coefficient $K'_Q$ which is a control indication value.

Equation 14

$$i_q = \frac{\tau}{p_P \cdot \phi_{red}} \quad (14)$$

Figure 8:
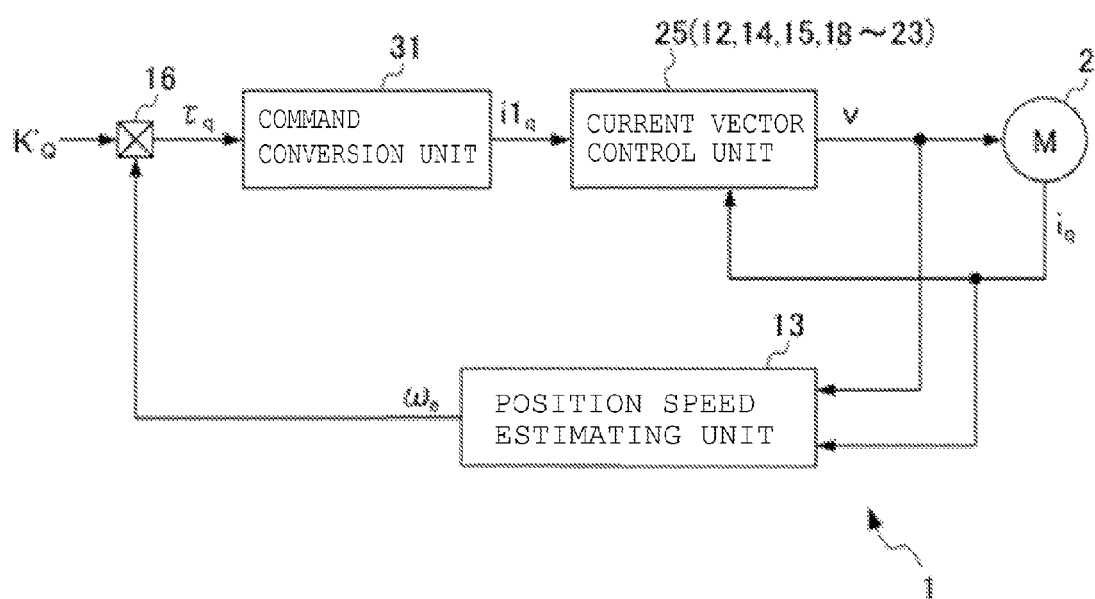
FIG. 8 is a view used in explaining the block diagram illustrated in FIG. 7.

Thus, the fan motor drive device 30 controls the drive current of the motor 2 by the feedback control illustrated in FIG. 8 in contrast with FIG. 3.

According to the configuration described above, when driving the motor by the vector control, the control amount is changed by changing the control target value based on the estimated value of the rotor magnetic flux intensity acquired in the position speed estimating calculator. This makes it possible to sufficiently reduce the change in the generated torque attributable to the variation of the rotor magnetic flux intensity.

Figure 9:
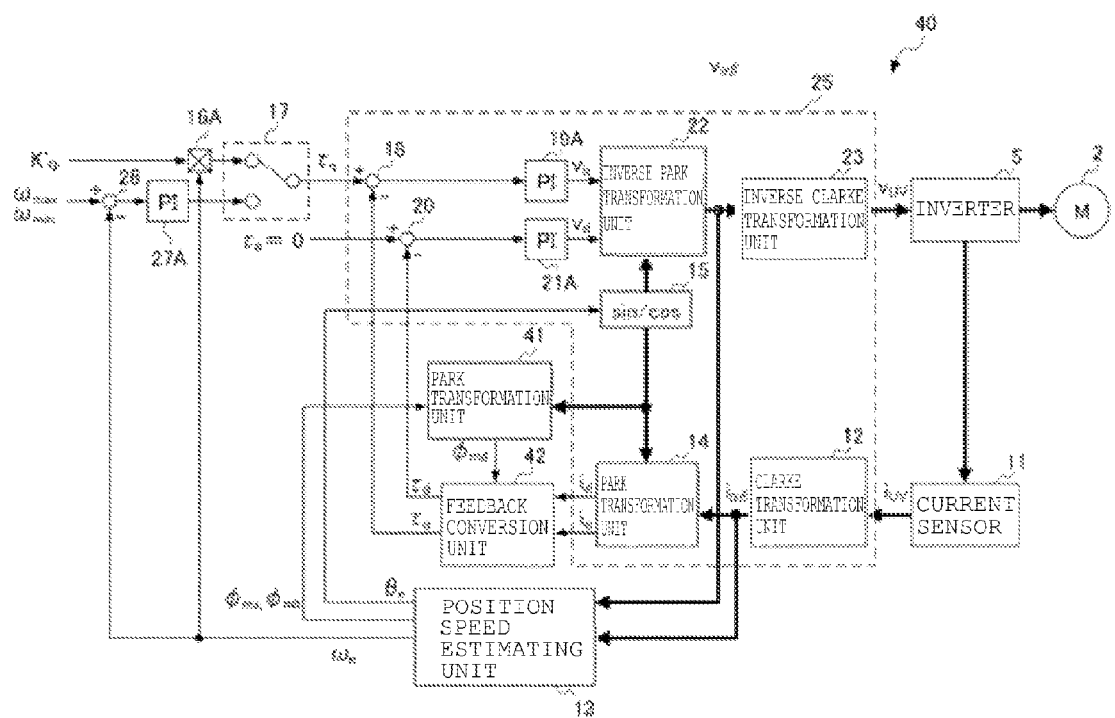
FIG. 9 is a block diagram illustrating a fan motor drive device according to another exemplary preferred embodiment of the present invention.

FIG. 9 is a block diagram illustrating, in contrast with FIG. 7, a fan motor drive device according to another exemplary preferred embodiment of the present invention. In the fan motor drive device 40, the control amount is changed by changing the feedback value related to feedback control instead of changing the control target value, thus reducing the change in the generated torque attributable to the variation of the rotor magnetic flux intensity. The fan motor drive device 40 is identical in configuration with the fan motor drive device 1 according to one exemplary preferred embodiment of the present invention except the difference in the configuration related to the change of the feedback value.

The fan motor drive device 40 acquires the estimated value $\phi_{md}$ of the rotor magnetic flux intensity by the calculation process of equation 12 instead of using a Park transformer 41. Furthermore, a feedback converter 42 converts current-value-dependent feedback values $i_d$ and $i_q$ to torque-value-dependent feedback values $\tau_d$ and $\tau_q$ by executing the calculation process of the following equation 15. Furthermore, the feedback converter 42 changes the feedback values $\tau_d$ and $\tau_q$ depending on the estimated value $\phi_{md}$ of the rotor magnetic flux intensity and outputs the changed feedback values to subtracting circuits 18 and 20.

Equation 15

$$[\tau_d \tau_q]^T = p_P \cdot \phi_{md} \cdot [i_d i_q]^T \quad (15)$$

Thus, PI controllers 19A and 21A generate a drive-voltage-dependent control value from the torque-value-dependent control value outputted from the subtracting circuits 18 and 20 and output the drive-voltage-dependent control value.

According to the configuration described above, even if the control amount is changed by changing the feedback value related to feedback control instead of changing the control target value, it is possible to obtain the same effects as obtained in one exemplary preferred embodiment of the present invention.

All of the above described components may be implemented by using: (i) a microcontroller which has been programmed to include functional blocks which correspond to the above components, (ii) a microcontroller which has been programmed to include functional blocks which correspond to some of the above components and which is connected to discrete electrical circuitry which provides the remaining components, and (iii) any other arrangement of a microcontroller, microprocessor, computer, etc. and any desired discrete electrical circuitry.

In the aforementioned preferred embodiments, descriptions have been made on the case where the control target value and the feedback value are adjusted depending on the rotor magnetic flux intensity found in the position speed estimating calculator. However, the present invention is not limited thereto. The control target value and the feedback value may be adjusted by separately detecting the rotor magnetic flux intensity.

In the aforementioned preferred embodiments, descriptions have been made on the case where the position speed estimating calculator to acquire a rotation angle and a rotation speed of a motor is provided to acquire a rotation angle and a rotation speed by the estimation and calculation from a drive current and a drive voltage. However, the present invention is not limited thereto. A position sensor such as an encoder or a resolver may be provided to acquire a rotation angle and a rotation speed. A rotation angle and a rotation speed may be acquired by processing the detection result of the position sensor.

In the aforementioned preferred embodiments, descriptions have been made on the case where one motor is preferably driven by the control target value, for example. However, the present invention is not limited thereto but may be widely applied to a case where a plurality of motors is driven. In this case, it is possible to prevent the variation of a torque between the motors which may otherwise be caused by the variation of a rotor magnetic flux intensity between the motors.

In the aforementioned preferred embodiments, descriptions have been made on the case where the current vector controller 25 used in vector control preferably is configured by the Clarke transformer 12, the calculator 15, the Park transformer 14, the subtracting circuits 18 and 20, the PI controllers 19 and 21, the inverse Park transformer 22 and the inverse Clarke transformer 23, for example. However, the present invention is not limited thereto but may be widely applied to a case where a current vector controller is configured by calculating a Clarke transformation processing result and a Park transformation processing result through approximate calculation processing.

In the aforementioned preferred embodiments, descriptions have been made on the case where the present invention is preferably applied to the air blower device which transfers a gas by diving a fan. However, the present invention is not limited thereto but may be widely applied to a case where a liquid is transferred by driving a fan (an impeller). This makes it possible to drive the fan by flow-rate-constant control.

In the aforementioned preferred embodiments, descriptions have been made on the case where the fan motor is driven by a three-phase brushless motor. However, the present invention is not limited thereto but may be widely applied to a case where various kinds of motors are driven.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A fan motor drive device configured to drive a fan with a motor, comprising:
    a position speed estimating calculator configured to calculate estimated values of a rotation angle and a rotation speed of the motor;
    a multiplier configured to calculate a control target value by multiplying the rotation speed calculated in the position speed estimating calculator and a flow coefficient; and
    a current vector controller configured to control a drive current of the motor by feedback control based on the control target value; wherein
    a rotor magnetic flux intensity of the motor is calculated based on at least a drive current obtained by a current sensor and the rotation angle obtained from the position speed estimating calculator, and a control value used in driving the motor is changed by the rotor magnetic flux intensity thus calculated.

2. The fan motor drive device of claim 1, wherein the control value is changed by using the multiplier to calculate a multiplied value using the rotor magnetic flux intensity.

3. The fan motor drive device of claim 1, wherein the control value is changed by modifying a feedback value used in the feedback control using the rotor magnetic flux intensity.

4. The fan motor drive device of claim 1, wherein the current vector controller includes:
    a Clarke transformer configured to Clarke-transform the drive current of the motor;
    a Park transformer configured to output the feedback value by Park-transforming an output of the Clarke transformer based on the rotation angle acquired in the position speed estimating calculator;
    a subtractor configured to calculate an output difference value between the control target value and the feedback value;
    a controller configured to generate the control value using an output of the subtractor;
    an inverse Park transformer configured to inversely Park-transform the control value based on the rotation angle acquired in the position speed estimating calculator; and
    an inverse Clarke transformer configured to inversely Clarke-transform an output of the inverse Park transformer.

5. The fan motor drive device of claim 2, wherein the current vector controller includes:
    a Clarke transformer configured to Clarke-transform the drive current of the motor;
    a Park transformer configured to output the feedback value by Park-transforming an output of the Clarke transformer based on the rotation angle acquired in the position speed estimating calculator;
    a subtractor configured to calculate an output difference value between the control target value and the feedback value;

a controller configured to generate the control value using an output of the subtractor;

an inverse Park transformer configured to inversely Park-transform the control value based on the rotation angle acquired in the position speed estimating calculator; and an inverse Clarke transformer configured to inversely Clarke-transform an output of the inverse Park transformer.

6. The fan motor drive device of claim 3, wherein the current vector controller includes:

a Clarke transformer configured to Clarke-transform the drive current of the motor;

a Park transformer configured to output the feedback value by Park-transforming an output of the Clarke transformer based on the rotation angle acquired in the position speed estimating calculator;

a subtractor configured to calculate an output difference value between the control target value and the feedback value;

a controller configured to generate the control value using an output of the subtractor;

an inverse Park transformer configured to inversely Park-transform the control value based on the rotation angle acquired in the position speed estimating calculator; and an inverse Clarke transformer configured to inversely Clarke-transform an output of the inverse Park transformer.

7. An air blower device configured to blow air by driving a motor of a fan with the fan motor drive device of claim 1.

8. An air blower device configured to blow air by driving a motor of a fan with the fan motor drive device of claim 2.

9. An air blower device configured to blow air by driving a motor of a fan with the fan motor drive device of claim 3.

10. An air blower device configured to blow air by driving a motor of a fan with the fan motor drive device of claim 4.

11. An air blower device configured to blow air by driving a motor of a fan with the fan motor drive device of claim 5.

12. An air blower device configured to blow air by driving a motor of a fan with the fan motor drive device of claim 6.

* * * * *